United States Patent [19]

Ninomiya et al.

[11] Patent Number: 4,500,911
[45] Date of Patent: Feb. 19, 1985

[54] NOISE REDUCTION APPARATUS

[75] Inventors: Yuichi Ninomiya; Yoshimichi Ohtsuka, both of Tokyo, Japan

[73] Assignee: Nippon Hoso Kyokai, Tokyo, Japan

[21] Appl. No.: 373,268

[22] Filed: Apr. 29, 1982

[30] Foreign Application Priority Data

May 25, 1981 [JP] Japan .................................. 56-77924
May 25, 1981 [JP] Japan .................................. 56-77925

[51] Int. Cl.³ ............................................. H04N 5/21
[52] U.S. Cl. ...................................... 358/36; 358/167
[58] Field of Search .................. 358/36, 37, 166, 167, 358/136; 382/31, 49, 54, 55

[56] References Cited

U.S. PATENT DOCUMENTS

| 4,090,221 | 5/1978 | Conner | 358/136 |
| 4,242,704 | 12/1980 | Ito et al. | 358/36 |
| 4,242,705 | 12/1980 | Ebihara | 358/36 |
| 4,296,436 | 10/1981 | Achiha | 358/167 |

FOREIGN PATENT DOCUMENTS 55-27765 2/1980 Japan .................................. 358/167

Primary Examiner—John C. Martin
Assistant Examiner—Michael D. Parker
Attorney, Agent, or Firm—Parkhurst & Oliff

[57] ABSTRACT

A noise reduction apparatus for reducing noises contained in a television picture signal is realized by comprising a low pass filter for filtering out noise components together with higher frequency components of the picture signal, the latter being compensated thereafter in response to detection of edge portions of the picture, as well as realized by utilizing interframe correlation of the television picture signal for reducing random noise components together with interframe varying components caused by motion of the picture, the latter being compensated thereafter in response to detection of the motion of the picture, which motion is discriminated by interframe variation of a group of picture elements. As a result, the noise reduction of the picture signal can be efficiently attained without any deterioration of picture quality, which is conventionally accompanied therewith.

7 Claims, 9 Drawing Figures

FIG_1
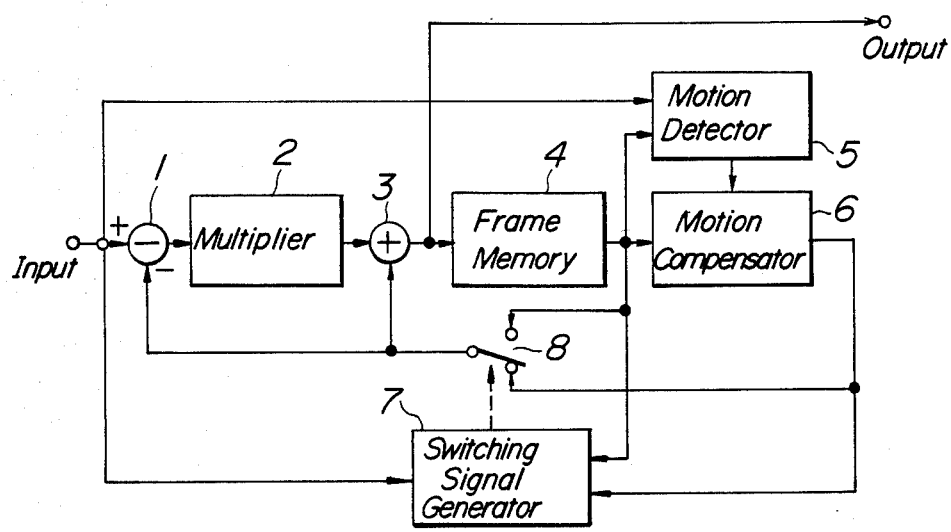
FIG_2
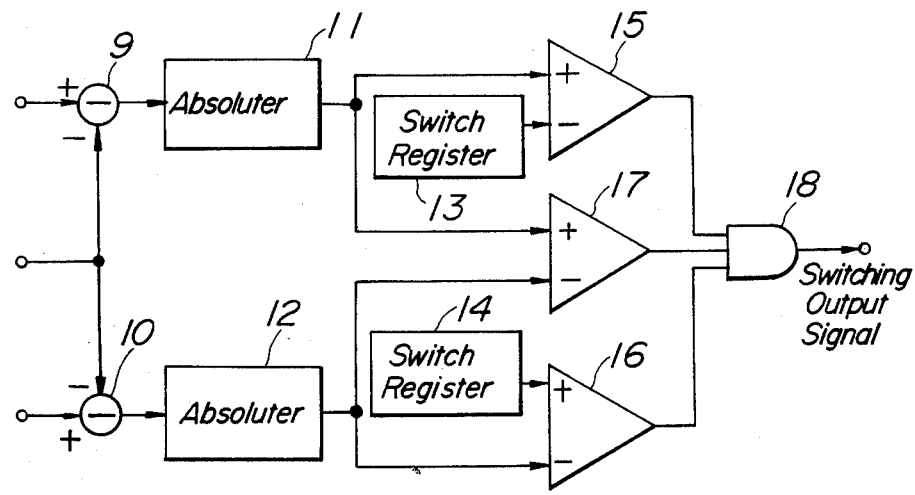

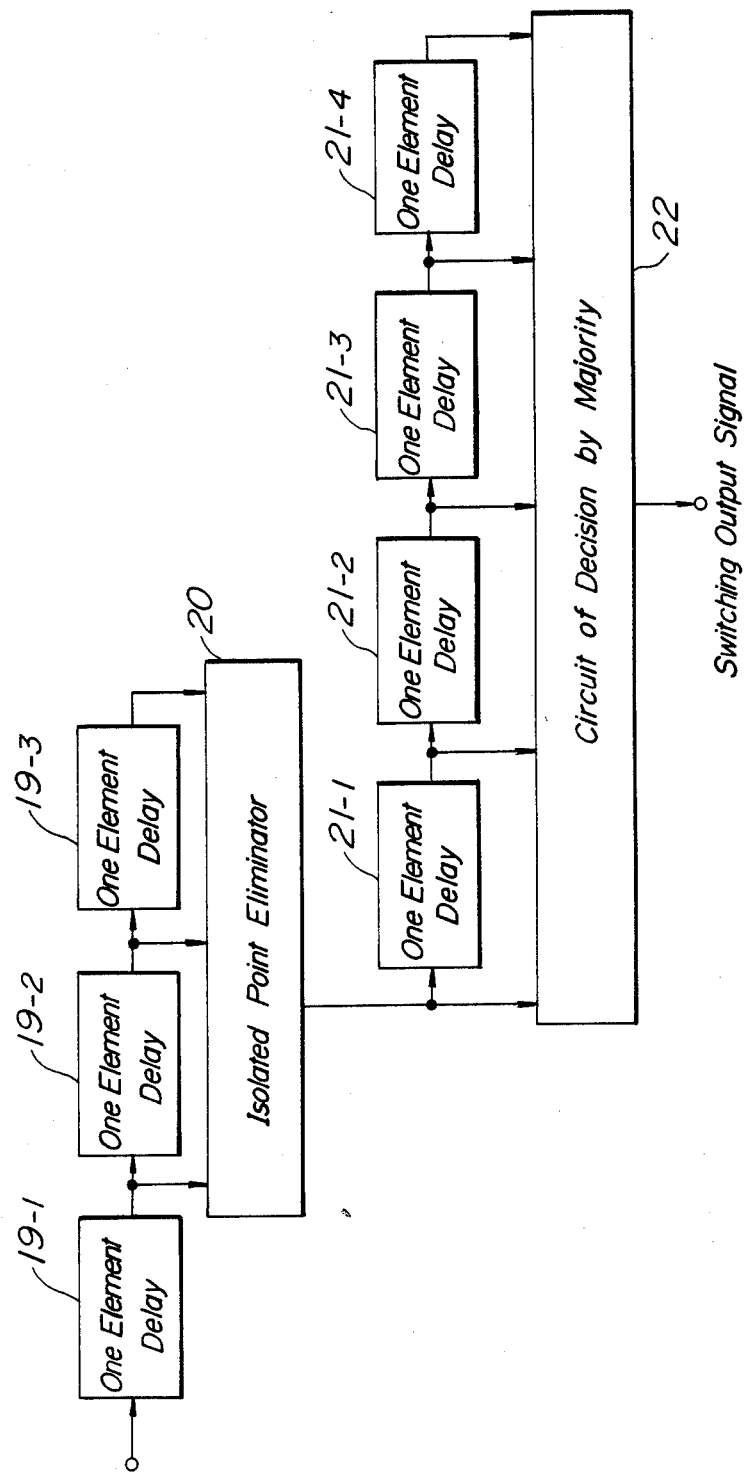

NOISE REDUCTION APPARATUS

BACKGROUND OF THE INVENTION (1) Field of the Invention

The present invention relates to a noise reduction apparatus for reducing noises of a television picture signal, particularly for effectively reducing only noise components thereof without any deterioration of picture quality in company therewith conventionally.

(2) Description of the Prior Art

Generally, noise components of a television picture signal are contained in a higher frequency range thereof, so that those noise components can be reduced by using a low pass filter as one of the most simple reduction method. However, in a situation where only the low pass filter is employed in a simple manner, high frequency components of the picture signal are reduced together therewith, and, as a result, the picture quality is extremely deteriorated.

In contrast therewith, the television picture signal has a a strong interframe correlation as one of distinct features thereof, so that random noise components having not such interframe correlations at all can be effectively reduced by the separation based on the interframe correlation.

On the other hand, with the recent progress of the coded television picture signal transmission, a picture signal interframe coding system for reducing an amount of coded signals to be transmitted by utilizing the above mentioned interframe correlation of the television picture signal is being developed. However, a troublesome problem regarding a moving picture which is usual for the television is caused by the weakened interframe correlation based on the motion of the picture, and hence has been left unsolved hitherto together with the above mentioned present problem regarding the interframe noise reduction of the moving picture signal. The present inventors disclosed "A Motion-Compensated Interframe Coding System" according to U.S. Pat. No. 4,307,420 as one of solutions for the above mentioned unsolved problems, in which system a motion-compensated interframe noise reduction accompanied with the motion-compensated interframe coding of the picture signal was proposed.

In a motion-compensated interframe noise reduction apparatus of the above mentioned kind, in which an input picture signal is positively added with a one-frame delayed picture signal thereof through a frame memory, the resultant picture signal being normalized, for intensifying picture signal components based on the interframe correlation thereof, as well as for averaging random noises having no interframe correlation, so as to reduce those noises in an output picture signal, the reduction of varying signal components losing the interframe correlation due to the motion of the picture together with those noises can be prevented by positively adding a motion-compensated predicted picture signal in which the lost interframe correlation has been restored by compensating those varying signal components in the moving portion of the picture in response to a result of detection of the motion, so that those noises can be separately reduced even in the moving portion of the picture.

In this motion-compensated interframe noise reduction apparatus, the above mentioned motion-compensated predicted picture signal is added in each block of picture elements having an appropriate region by switching over from an ordinary predicted picture signal in response to the result of detection of the motion in the above each region. However, the motion of the picture is detected under the descrimination of an amount of interframe difference of the picture signal, so that, when the amount of the interframe difference is increased by the noise, the motion-compensated predicted picture signal is positively added to stationary portions of the picture signal and hence the picture quality is deteriorated rather than improved.

On the other hand, in the interframe noise reduction apparatus of the above mentioned kind, the noise reduction rate is generally lowered in moving portions of the picture, because, in a situation where the noise reduction rate is not lowered, the above mentioned secondary deterioration of the picture quality is caused by the noise reduction. One of solutions for this problem of the secondary deterioration of picture quality is the above mentioned motion-compensated interframe noise reduction. However, under certain circumstances, the sufficient noise reduction cannot be attained in moving portions of the picture. In these circumstances, the noise reduction cannot help being effected by an inframe signal treatment instead of the above mentioned interframe signal treatment. The principle of this inframe noise reduction is in a word that the noise is reduced through a spatial low pass filter. However, in a situation where only the low pass filter is employed in a simple manner, the secondary deterioration based on the reduction of higher frequency components of the picture signal is caused as mentioned earlier.

In addition, it is further defective that the signal to noise ratio is not so increased subjectively by reducing noise components in a frequency range higher than 1 to 2 MHz, and hence the pass band of the low pass filter used for the noise reduction cannot help being considerably narrowed. Consequently, the picture quality obtained by simply employing the low pass filter cannot help being extremely deteriorated.

In regard to the above problem, several kinds of inframe noise reduction apparatus for preventing the above mentioned secondary deterioration of picture quality which is caused by the employment of the filter have been proposed. It is an example thereof to employ a well-known Wiener filter by which the noise reduction is effected by utilizing the different of the statistical performance between the picture signal components and the noise components of the television picture signal. However, these conventionally proposed noise reduction apparatus of this kind have a common defect that the circuit configuration and the process of signal treatment are considerably complicated, and hence it is so difficult to treat the television picture signal in real time.

Apart from the above proposed apparatus, another kind of conventional inframe noise reduction apparatus for utilizing the visual property of the television picture has been proposed. Generally, an extreme gradation, namely, lack of sharpness of the television picture is visually perceived due to the gradation caused in edge portions thereof, so that the employment of the low pass filter having a narrow pass band regarding flat portions of the television picture can reduce the visual gradation caused on the whole of the picture by virtue of the lowered visual sensitivity regarding the edge portions thereof less than regarding the flat portions, although more noise components are left in those edge portions in comparison with the flat portions. However, this preferable noise reduction apparatus has also another defect such as the employed low pass filter necessitates to use non-linear circuit components and to complicate the conventional circuit configuration required for obtaining the above mentioned preferable performance.

SUMMARY OF THE INVENTION

An object of the present invention is to remove the above mentioned various defects from a noise reduction apparatus.

Another object of the present invention is to provide a noise reduction apparatus comprising a low pass filter having a suitable pass band performance fitted to the visual property of the television picture and a comparatively simple circuit configuration.

Still another object of the present invention is to provide a noise reduction apparatus for preventing an erroneous operation caused by the effect of the noise in the positive addition of the motion-compensated predicted picture signal in response to the result of detection of the motion of the television picture.

A feature of a noise reduction apparatus according to the present invention is that noise components of a television picture signal are reduced together with either inframe higher frequency components or interframe varying components in the higher frequency range, the latters being compensated thereafter in response to detection of those inframe higher frequency components or interframe varying components in the higher frequency range.

Another feature of the noise reduction apparatus according to the present invention is that the noise components of the television picture signal are reduced by a low pass filter together with inframe higher frequency components thereof, the latter being compensated thereafter in response to detection of edge portions of the television picture.

Still another feature of the noise reduction apparatus according to the present invention is that the noise components of the television picture signal are reduced by utilizing the interframe correlation thereof together with interframe varying components in the higher frequency range, the latter being compensated thereafter in response to detection of the motion of the television picture regarding each group of picture elements.

On account of the above mentioned features of the noise reduction apparatus according to the present invention, an output picture signal derived therefrom can be prevented from the deterioration of picture quality caused by both of the presence of noise components and the lack of necessary signal components.

BRIEF DESCRIPTION OF THE DRAWINGS

For the better understanding of the invention, reference is made to the accompanying drawings, in which:

FIG. 1 is a block diagram showing an example of circuit configuration of a noise reduction apparatus according to the present invention;

FIG. 2 is a block diagram showing an example of circuit configuration of a switching signal generator comprised in the noise reduction apparatus according to the present invention;

FIGS. 3 and 4 are block diagrams showing other examples of circuit configuration of the switching signal generators;

DESCRIPTION OF THE PREFERRED EMBODIMENTS

Figure 4:
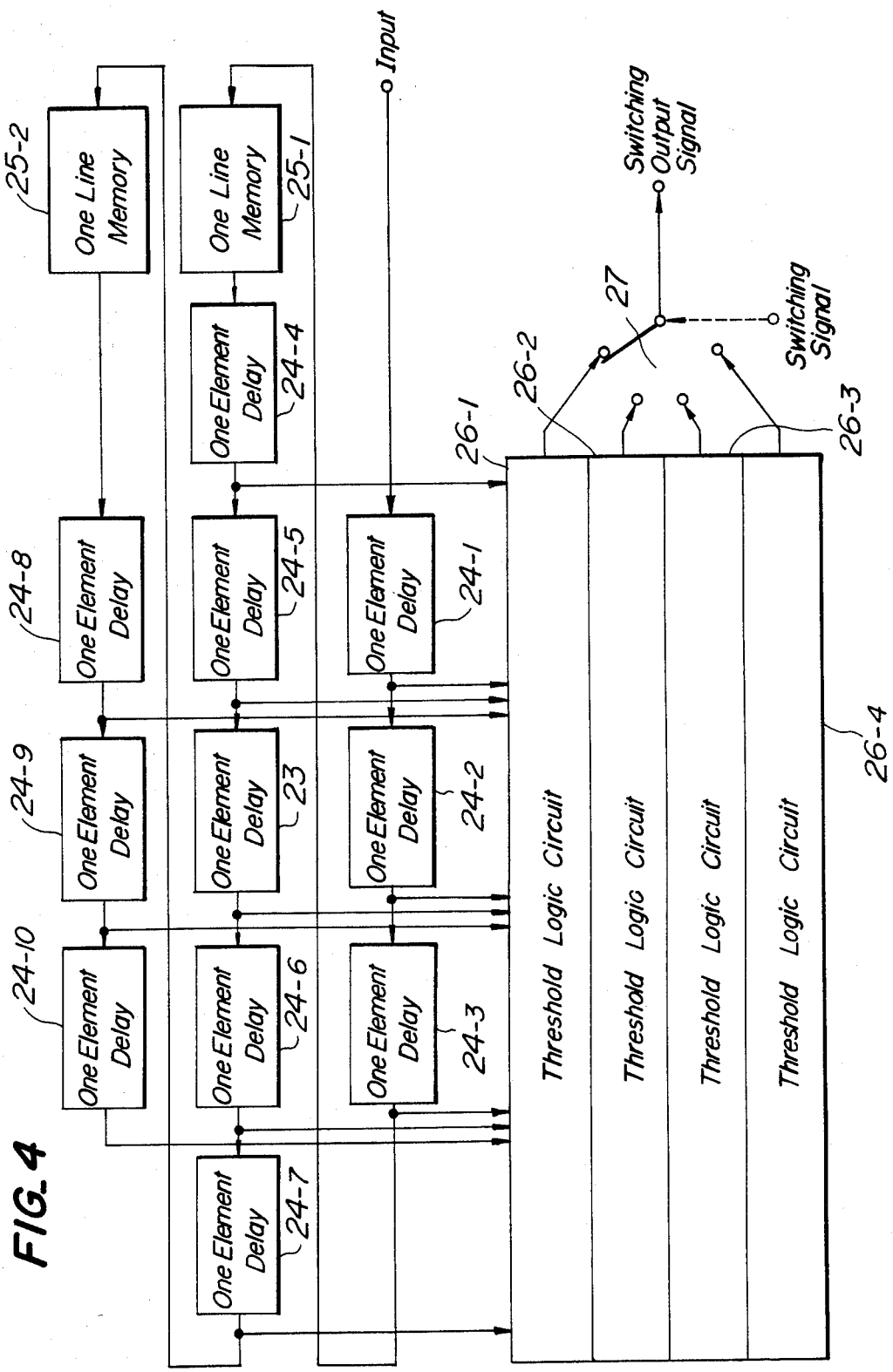

For the better understanding of the invention also, the description is firstly made regarding an interframe noise reduction apparatus for reducing noise components of a television picture signal by utilizing an interframe correlation thereof in connection with aforesaid U.S. Pat. No. 4,307,420 "Motion Compensated Interframe Coding System" which has been filed by the present inventors.

Generally, in a motion-compensated interframe noise reduction apparatus, a predicted picture signal formed by compensating a one-frame preceding picture signal regarding the motion thereof by referring to a detected interframe difference resembles closely a present frame picture signal. However, the above motion compensation is effected conventionally regarding each block of picture elements situated in a region of, for instance, 16 elements on each of 8 lines, so that, in a situation where both of moving picture elements and stationary picture elements are contained in the same block of picture elements, the close resemblance between the motion-compensated predicted picture signal and the present frame picture signal cannot be necessarily attained in respect to each picture element of the predicted picture signal.

That is, stationary picture elements are shifted together with moving picture elements by the motion compensation, and, as a result, a secondary difference is newly caused between the predicted picture signal and the present frame picture signal. Accordingly, it is suitable for this situation that either one of the motion-compensated predicted picture signal and the non motion-compensated predicted picture signal which one resembles the present frame signal closer than the other is employed for the interframe noise reduction by switching over one another. An algorithm for this switching over is in a word as mentioned above. On the other hand, the picture signal necessitating the noise reduction is no more than a noisy picture signal having a lowered signal to noise ratio, so that it has a good chance that distinct noises are erroneously discriminated as a motion of the picture, and hence the above switching over is not appropriately effected.

Consequently, the above mentioned conventional switching over between the motion-compensated predicted picture signal and the non motion-compensated predicted picture signal, which is effected simply in response to the result of detection of the motion of each picture element, cannot only obtain a sufficient effect of noise reduction, but there is every possibility that a secondary increase of noise is newly caused by this switching over.

On the other hand, the conventional motion detection is effected regarding each block of picture elements, so as to obtain the effect of noise reduction by averaging noises contained in each block of picture elements, so that it can be recognized that the detection of the motion thereof is exactly performed. However, a switching signal obtained in response to the result of this motion detection cannot be necessarily recognized to be exact by the above mentioned reason. Moreover, the above mentioned switching over performed regarding each block of picture elements brings about further problem that a secondary distortion may be caused between adjacent blocks of picture elements.

In consideration of the above, in the noise reduction apparatus according to the present invention, the switching over between the motion-compensated predicted picture signal and the non motion-compensated predicted picture signal is performed regarding each picture elements, as well as the motion detection on which the switching over is based is also performed regarding each picture element, and further this motion detection regarding each picture element is not simply performed regarding succeeding picture elements successively, but is performed on the whole containing adjacent picture elements surrounding each picture element, so that the above mentioned erroneous motion detection caused by the motion detection regarding each picture element alone can be prevented.

For example, a group of picture elements dispersing in a region centering around each picture element which is regarded as a direct target of the motion detection and extended by a few lines and a few element length is regarded also as a target of the motion detection, so that it can be avoided that the results of the motion detection are different between the isolated direct target picture element and the group of picture elements surrounding the direct target, and, as a result, the above mentioned erroneous motion detection can be prevented.

In addition, various weighting factors, the greatest one of which is given to the direct target picture element, are allotted to the group of picture elements and then the motion detection thereof is synthetically effected. According to this synthetic motion detection, it is possible that the erroneous motion detection which may be caused by the motion detection regarding each picture element alone can be prevented, so as to obtain an exact switching over signal.

An example of circuit configuration of a noise reduction apparatus according to the present invention based on the above mentioned principle of operation is shown in FIG. 1.

In this exemplified circuit configuration, a picture signal derived from an input terminal is supplied to a subtracter 1 for obtaining a difference thereof from a predicted present frame picture signal formed as described later. A difference output signal obtained as mentioned above is multiplied by a factor in a multiplier 2, which factor does not exceed unity, and then is supplied to an adder 3. In this adder 3, the multiplied difference signal is added to the above mentioned predicted present frame picture signal, the added output picture signal being taken out from an output terminal, as well as being stored in a frame memory 4, so as to prepare for forming the predicted picture signal. A one frame preceding picture signal derived from the frame memory 4 after one frame delay is supplied to a motion detector 5, a motion compensator 6, a switching signal generator 7 and a switch 8 in parallel, and further is supplied to the aforesaid subtracter 1 as a non motion-compensated predicted picture signal under the judgement effected by the switching signal generator 7 as described later, so as to obtain the difference thereof from the present frame picture signal supplied from the input terminal as mentioned earlier. The one frame preceding picture signal supplied to the motion detector 5 is compared with the present frame picture signal supplied thereto from the input terminal, so as to detect the motion of the picture, a motion vector resulted from the motion detection being supplied to the motion compensator 6, so as to form a motion-compensated predicted picture signal by compensating the one frame preceding picture signal supplied from the frame memory 4 under the prediction of the motion thereof. This motion-compensated predicted picture signal is supplied also to the subtracter 1 through a switch 8 under the judgement effected by the switching signal generator 7 as described later.

In the switching signal generator 7 which is supplied with the aforesaid motion-compensated and the aforesaid non motion-compensated predicted picture signals and further the present frame picture signal derived from the input terminal, which of the motion-compensated and the non motion-compensated predicted picture signals resembles closer to the present frame picture signal is judged, and, in response to a result of this judgement, either one of those predicted picture signals, which one resembles closer than the other to the present frame picture signal, is supplied to the aforesaid subtracter 1 through the switch 8, as well as is supplied also to the adder 3, in which a weighted interframe difference picture signal formed in the multiplier 2 is added to the aforesaid predicted present frame picture signal, so as to obtain the desired noise reduced output picture signal.

Next, an example of circuit configuration of the switching signal generator 7 operated as a principal part of the noise reduction apparatus operating as mentioned above in the arrangement as shown in FIG. 1 is shown in FIG. 2. In this exemplified switching signal generator 7, each of the motion-compensated and the non motion-compensated predicted picture signals are compared with the present frame picture signal as mentioned above, and then either one of those predicted picture signals which one resembles to the present frame picture signal closer than the other is supplied to the subtracter 1 and the adder 3 through the switch 8, and further, for attaining the above purposed operation, when a judged output signal having a high logic level is obtained, the switch 8 is controlled thereby such as the motion-compensated predicted picture signal is supplied to the subtracter 1 and the adder 3.

In addition thereto, it is feared that the erroneous switching signal is generated by the noise only under the aforesaid judgement effected by the switching signal generator 7, so that the motion of the picture is judged on the whole of the afresaid group of picture elements centering around the direct target picture element of the motion detection as described later by referring to FIGS. 3 and 4, and further, in a situation where the direct target picture element is isolated, the result of the motion detection regarding this isolated direct target picture element is abandoned, as well as the decision by majority or the weighting for the result of the motion detection is effected, so as to obtain the exact switching signal based on the final result of appropriate judgement.

In view of the above, in the switching signal generator arranged as shown in FIG. 2, the non motion-compensated and the motion-compensated predicted picture signals derived from respective input terminals are supplied respectively to subtracters 9 and 10, so as to obtain a difference picture signals between those predicted picture signals and the input present frame picture signal respectively. Those difference picture signals are supplied to absoluters 11 and 12 respectively, so as to obtain respective absolute values, those absolute difference signals being supplied to comparators 15 and 16 respectively and further to a comparator 17 commonly.

Under the judgement that the motion-compensated predicted picture signal should be employed for the noise reduction in a situation where the following conditions are entirely satisfied, an high logic level output signal can be derived from an AND-gate 18 which are supplied with respective output signals of those comparators 15, 16 and 17.

Condition (1): The difference between the non motion-compensated predicted picture signal and the present frame picture signal is larger than a threshold supplied by a switch register 13.

This condition (1) indicates that the picture contains a motion such as the difference between the present frame picture signal and the predicted signal which is not motion-compensated is increased. That is, the motion compensation cannot help being effected on the whole of a group of picture elements consisting in a picture block, so that stationary picture elements contained in the picture block are shifted together with moving picture element to be motion-compensated, and, as a result, it is required to prevent secondary differences caused newly between the motion-compensated predicted picture signal and the present frame picture signal in company with the motion compensation.

The condition (1) further indicates that, in a situation where the difference between the non motion-compensated predicted picture signal and the present frame picture signal is smaller than the threshold supplied by the switch register 13, stationary picture elements which are not required to be compensated by employing the motion-compensated predicted picture signal are treated as the direct target picture elements of the motion detection.

Condition (2): The difference between the motion-compensated predicted picture signal and the present frame picture signal is smaller than a threshold supplied by a switch register 14.

This condition (2) indicates that the motion compensation is appropriately effected, and, as a result, the motion-compensated predicted picture signal resembles closely the present frame picture signal. That is, in the noise reduction apparatus in which noisy picture signals are treated, in a situation when the picture signal is extremely noisy, the noise intermixed into the result of motion detection affects strongly the result of motion compensation, and, as a result, there is every possibility that the exact motion compensation is not appropriately effected and hence a lumped distortion appears in the picture in company with the motion compensation. On the contrary, in a situation where the exact motion compensation is appropriately effected, the difference between the motion-compensated predicted picture signal and the present frame picture signal cannot be increased so large. Consequently, the condition (2) indicates that, when the above difference is increased so large, the motion compensation cannot be appropriately effected, and hence the erroneous motion compensation is effected, so that the non motion-compensated predicted picture signal should be employed for the noise reduction.

Condition (3): In the comparison between respective absolute values of differences between the present frame picture signal and both of the non motion-compensated and the motion-compensated predicted picture signals respectively, which comparison is effected by the comparator 17, the latter difference is smaller than the former difference.

The above mentioned three conditions indicate in a word that either one of the motion-compensated and the non motion-compensated predicted picture signals which one resembles the present frame picture signal closer than the other should be employed for the noise reduction, and further that, in the judgement regarding which resembles closer to the present frame picture signal, the non motion-compensated predicted picture signal should be employed for the noise reduction, when it is judged that stationary picture elements are examined and that the erroneous motion compensation is effected.

As mentioned above, in the judgement regarding the switching over between the motion-compensated and the non motion-compensated predicted picture signals, there is every possibility that the erroneous judgement is induced by the effect of the noise in a situation where each direct target picture element is examined alone.

Under consideration of the above, the switching signal generator 7 consisting in the circuit configuration as shown in FIG. 1 is arranged as shown in FIG. 3 or 4 according to the present invention such as each direct target picture element can be examined by referring to the situation of a group of picture elements centering around the direct target.

In the switching signal generator 7 arranged as shown in FIG. 3, in which a group of picture elements which are dispersed on the same line as the direct target picture element is situated is examined, a picture signal derived is successively supplied through an input terminal to a series connection of one element delays 19-1 to 19-3, so as to obtain successively delayed picture signals which are successively delayed by one element respectively. Those delayed picture signals are supplied to an isolated point eliminator 20, so as to eliminate an isolated point picture signal which is different from those of adjacent points thereof by comparing with each other. In the isolated point eliminator 20, when both of adjacent elemental picture signals among successive three elemental picture signals have a high logic level H and a central direct target elemental picture signal has a low logic level L and vice versa, the central direct target elemental picture signal is judged to be isolated, namely, to be inadequate for being used as the target under the influence of the noise and the like, and hence is removed. This comparison between successive elemental picture signals can be effected also regarding another group of more adjacent elemental picture signals and the central direct target elemental picture signal by increasing the number of successively arranged one element delays 19. The above successively delayed picture signals, from which the isolated elemental picture signal has been removed as mentioned above, are supplied to a circuit of decision by majority directly and successively through one element delays 21-1 to 21-4 so as to effect the judgement based on the decision by majority regarding those successively one element delayed picture signals. In this judgement based on the decision by majority, for instance, regarding successive five elemental picture signals, when more than three elemental picture signals have the high logic level H respectively, the judged output signal is given with the high logic level H also and vice versa. This judged output signal is used for controlling the aforesaid switching over between the predicted picture signals.

In the switching signal generator 7 arranged as mentioned above, only adjacent elemental picture signals dispersed on the same line as the direct target elemental picture element are used for the uni-dimensional judgement. In contrast therewith, the more exact judgement can be effected by using a group of elemental picture signals dispersed in a two-dimensional region as shown in FIG. 4. In the switching signal generator 7 arranged as shown in FIG. 4, a picture signal derived from an input terminal is supplied through an input terminal to a series connection of delays, in which connection a group of one element delays 24-1 to 24-10 centering around one element delay 23 used for deriving a direct target elemental picture signal is arranged on three lines successively shifted through one line memories 25-1 and 25-2, so as to derive a group of eleven elemental picture signals consisting of respective two elemental picture signals on right and left sides of respective lines surrounding the central direct target elemental picture signal for effecting the two dimensional judgement. By the way, each of those one line memories 25-1 and 25-2 gives one line delay shortened by four element delays to the picture signal.

The above group of eleven elemental picture signals is supplied to a group of threshold logic circuits 26-1 to 26-4, which are used also as decision signal generators. In these decision signal generators 26-1 to 26-4 which are operated similarly as described above by referring to FIG. 3, the removal of isolated point elemental picture signal, the judgement based on the decision by majority and the judgement weighted in response to situations of picture elements are effected, and hence the switching over signal is output in response to the results of these judgements.

These decision signal generators, namely, these threshold logic circuits 26-1 to 26-4 can be formed only of logic circuits in a situation where the algorism of the judgement is comparatively simple, whilst those circuits 26-1 to 26-4 can be realized also under the control of complicated algorism without any complication of circuit configuration by employing a read only memory, that is, a so-called ROM, which is operated such as various results of judgement previously examined regarding various kinds of formal patterns of targets are previously accumulated therein.

The above mentioned judgement effected regarding the direct target elemental picture signal by referring to adjacent elemental picture signals thereof is purposed for preventing erroneous judgements caused by the noise contained in the input picture signal. Accordingly, in a situation where an excellent signal to noise ratio can be obtained in the input picture signal, a contrary effect such as even the direct target elemental picture signal cannot be exactly judged may be caused.

Under consideration of the above, in the switching signal generator 7 arranged as shown in FIG. 4, the decision signal generators, namely, threshold logic circuits 26-1 to 26-4 of four kinds, which have successively different algorithms of judgement and successively different region of picture elements to be examined, are provided and hence the most appropriate one thereof can be employed for the judgement by manually or automatically operating a selecting switch 27 under the control of a switching signal 28 formed in response to the signal to noise ratio of the input picture signal.

Figure 7:
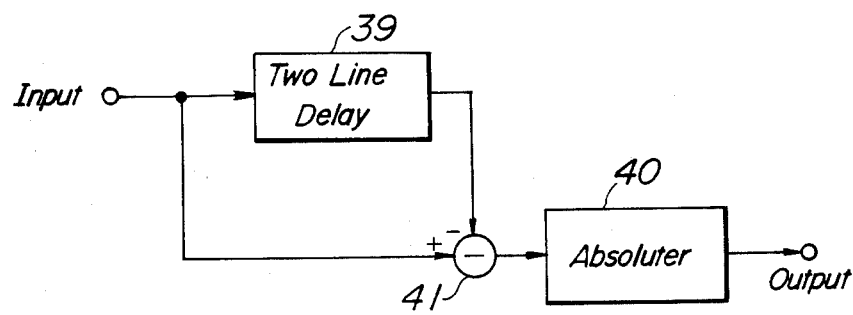
FIG. 7 is a block diagram showing an example of circuit configuration of a horizontal edge portion detector comprised in the circuit configuration shown in FIG. 5.
Figure 8:
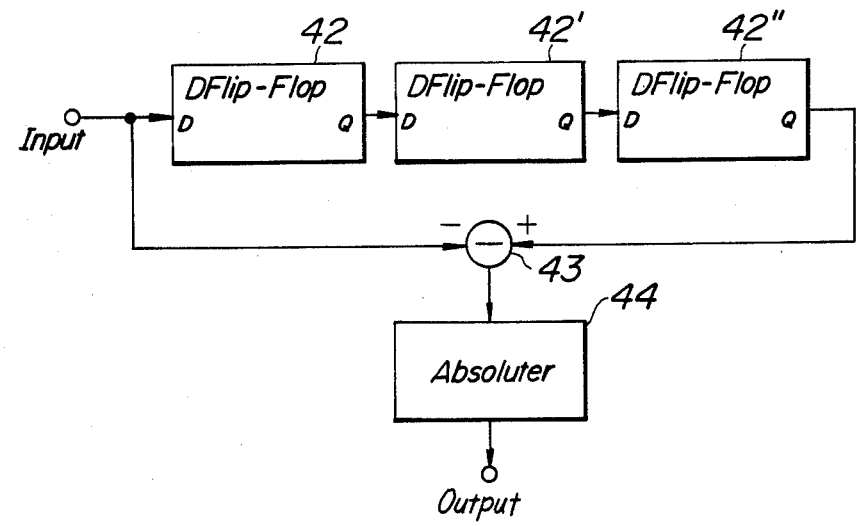
FIG. 8 is a block diagram showing an example of circuit configuration of a vertical edge portion detector comprised in the circuit configuration shown in FIG. 5.

Next, another example of circuit configuration of the noise reduction apparatus according to the present invention, which comprises a low pass filter for reducing the noise as mentioned earlier is shown in FIG. 5. In this exemplified noise reduction apparatus, a two dimensional low pass filter 31, which electrically corresponds to a spatial low pass filter, has an suitable pass band performance such as noise components can be sufficiently reduced in flat portion of the picture. This filter 31 will be simply named a low pass filter hereinafter. In a horizontal edge portion detector 32, a detected output signal which is proportional to horizontal edge components of the input picture signal can be obtained by being arranged as shown in FIG. 7. On the other hand, in a vertical edge portion detector 33, a detected output signal which is proportional to vertical edge components of the input picture signal can be obtained by being arranged as shown in FIG. 8. Those horizontal and vertical edge portion detection output signals are mixed in each other by an adder 34, so as to form the whole edge components of the input picture signal.

Figure 5:
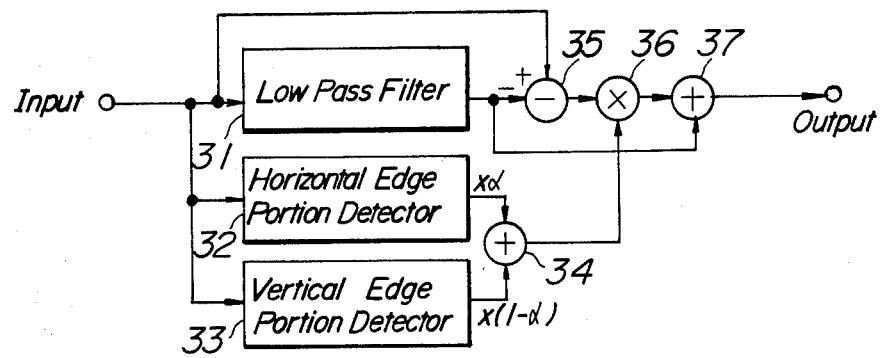
FIG. 5 is a block diagram showing another example of circuit configuration of the noise reduction apparatus according to the present invention.

In this exemplified noise reduction apparatus arranged as shown in FIG. 5, the input picture signal derived from an input terminal is supplied to the horizontal edge portion detector 32 and the vertical edge portion detector 33 is parallel, and further a filtered output picture signal derived from the low pass filter 31 and the input picture signal are supplied to a subtracter 35, so as to obtain removed components derived from the low pass filter 31, namely, mixed components consisting of noise components detected in flat portions and edge components containing noise components, by subtracting the noiseless and gradated filtered output picture signal from the sharp and noisy input picture signal. These removed components, that is, mixed components are multiplied by the whole edge components derived from the adder 34 in a multiplier 36, so as to emphasize only noisy edge components of the input picture signal, which is further added to the filtered output picture signal derived from the low pass filter 31 in an adder 37, so as to obtain the filtered output picture signal, both of noise components and edge components in edge portions of which are restored as well as noise components in flat portions of which are sufficiently reduced, namely, the desired low pass filtered output picture signal.

In the above mentioned process of noise reduction, in a situation where a ratio $\beta$ of edge components to the input picture signal $A_i$ is set as $0 \leq \beta \leq 1$, the low pass filtered output picture signal $A_o$ which has been compensated according to the circuit configuration arranged as shown in FIG. 5 can be expressed by a following equation (1) in comparison with an ordinary low pass filtered output picture signal $A_l$.

$$A_o = A_l + \beta(A_i - A_l) = \beta A_i + (1-\beta)A_l \tag{1}$$

Consequently, in the noise reduction apparatus according to the present invention, the reduction of edge components which lowers considerably the sharpness of the picture is avoided in edge portions where the noise is not conspicuous, whilst noise components are sufficiently reduced in flat portions where the noise is conspicuous, and, as a result, an excellent filtered output picture signal can be obtained.

Figure 6:
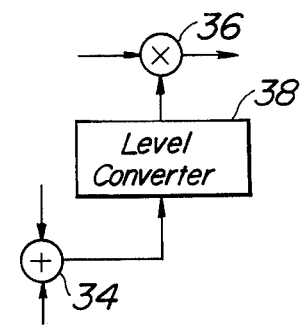
FIG. 6 is a block diagram showing another example of a part of the circuit configuration shown in FIG. 5.

In connection therewith, the above equation (1) indicates a linear relation regarding the ratio between the input picture signal $A_i$ and the low pass filtered output picture signal $A_f$. However, in a modified circuit configuration, as shown in FIG. 6, such as signal levels of edge components are non-linearly compensated in response to the visual performance by inserting a non-linear level converter 38 between the adder 34 and the multiplier 36, so as to multiply the aforesaid mixed components by the whole edge components, low level noise components of which are lowered, it is possible to suppress the restoration of the noise in edge portions of the output picture signal, and further it is also possible to facilitate the construction of the above-mentioned non-linear level converter 38 by employing a fixed memory device, that is, a so-called ROM.

Next, still another example of circuit configuration of the noise reduction apparatus for reducing the noise of an input color composite picture signal according to the present invention will be described hereinafter.

Firstly, in an example of circuit configuration of the aforesaid horizontal edge portion detector 32, both of input and output picture signals of a two line delay 39 are supplied to a subtracter 41 and further a subtrated output signal thereof is supplied to an absoluter 40, so as to obtain horizontal edge components consisting of similar frequency components as color subcarrier components of an NTSC system colored picture signal by mutually cancelling those color subcarrier components having the same phase every two lines repeatedly. However, the horizontal edge components obtained according to the above mentioned circuit configuration have a time delay being longer than one line period in comparison with the input picture signal, so that it is necessary to deal with this time delay by appropriately supplementing respective delays to several parts of the aforesaid circuit configuration.

On the other hand, in an example of circuit configuration of the aforesaid vertical edge portion detector 33 arranged as shown in FIG. 8, which is provided for reducing noise components of a colored picture signal digitized at a sampling frequency of three times of the color subcarrier frequency $f_{sc}$, that is, $3 \times f_{sc}$, an input digital colored picture signal is supplied to a series connection of three stages of D-type flip-flops 12, 12' and 12'', each of which delayes each bits thereof respectively, so as to delay the input picture signal by three times of the sampling interval, an input and an output digital picture signals of which connection are supplied to a subtracter 43, so as to derive edge components, from which color subcarrier components are removed, through an absoluter 44 as a subtracted output signal thereof. Those vertical edge components derived from the above mentioned circuit arrangement have also a time delay in comparison with the input colored digital picture signal, so that, similarly as mentioned above regarding the horizontal edge portion detector 32, it is necessary to deal with this time delay by appropriately supplementing respective delays to several parts of the aforesaid circuit configuration.

Figure 9:
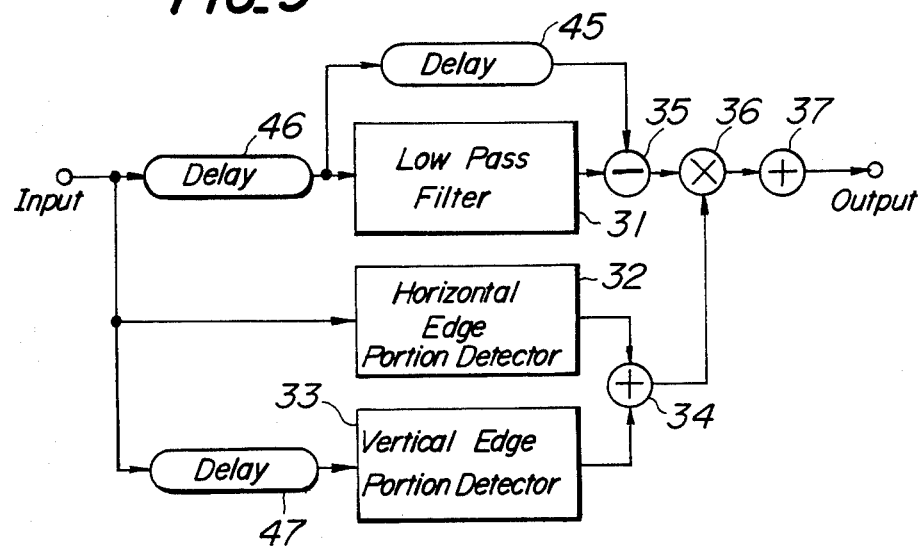
FIG. 9 is a block diagram showing still another example of the noise reduction apparatus according to the present invention.

Next, further another example of circuit configuration of the noise reduction apparatus according to the present invention, in which the noise reduction is effected after color subcarrier components are removed therefrom as mentioned above, is shown in FIG. 9. In this exemplified noise reduction apparatus, as is apparent from the mentioned above, the aforesaid time delay caused in the output edge components is compensated by supplementing delays 45, 46 and 47 to a circuit configuration arranged similarly as shown in FIG. 5. By the way, it is a matter of course that the circuit configuration arranged as shown in FIG. 9 is employed for the noise reduction regarding the composite colored picture signal, whilst the other circuit configuration arranged as shown in FIG. 5 is employed for the noise reduction regarding the monochrome picture signal and the component colored picture signal.

As is apparent from the above description, according to the present invention, either one of the motion-compensated predicted picture signal which is formed by motion-compensating a one frame delayed picture signal and the non motion-compensated predicted picture signal which is formed simply of a one frame delayed predicted picture signal is employed for the noise reduction effected by utilizing the interframe correlation of the picture signal, which one resembles the present frame picture signal closer than the other, by switching over each other in response to the result of judgement of the presence of motion regarding every picture element, so as to prevent the conventional gradation of moving portions of the picture in company with the noise reduction and the conventional restoration of the remaining noise of moving portions in company with the prevention of the above gradation.

In addition thereto, the above mentioned judgement of the presence of motion regarding every picture element is effected by referring to the situation of adjacent picture elements surrounding respective target picture element, so as to perform the more exact switching over between the above mentioned two kinds of predicted picture signal for preventing the lumped distortion of moving portion of the picture and the undesired shift of the stationary picture elements in company with the erroneous noise reduction effected by employing the insufficiently motion-compensated predicted picture signal regarding intensely moving portions of the picture. As a result thereof, the interframe noise reduction can be effected extremely exactly.

In much more addition thereto, according to the present invention, an excellent low pass filter used for the noise reduction with the desired non-linear performance can be easily realized by a comparatively simple circuit arrangement, so that the simple inframe noise reduction of the television picture signal can be sufficiently effected even regarding the moving picture without the employment of the interframe correlation thereof. Consequently, this inframe noise reduction according to the present invention cannot be employed only together with the interframe noise reduction according to the present invention, but can be employed alone with the remarkable effect.

What is claimed is:

1. A noise reduction apparatus for reducing noise components in an input picture signal, comprising:
   a low pass filter means for reducing noise components in an input picture signal and providing an output signal;
   a horizontal edge portion detector means for detecting horizontal edge components of said input picture signal and providing an output signal;

a vertical edge portion detector means for detecting vertical components of said input picture signal and providing an output signal;

a first adder means for adding the output signals of said horizontal and said vertical edge portion detector means to each other and providing an output signal;

a subtractor means for subtracting the output signal of said low pass filter means from said input picture signal and providing an output signal;

a multiplier means for multiplying the output signal of said subtractor means by the output signal of said first adder means and providing an output signal; and a second adder means for adding the output signal of said multiplier means to the output signal of said low pass filter means to obtain an output picture signal having reduced noise components.

2. A noise reduction apparatus as claimed in claim 1, further comprising:

a level converter means for compensating a signal level of said output signal of said first adder means in response to the visual performance.

3. A noise reduction apparatus as claimed in claim 1, wherein said input picture signal is colored and said horizontal edge portion detector means comprises:

a two line delay means for delaying said input picture signal by two lines duration, a subtracter means for subtracting an output signal of said two line delay means from said input picture signal, and an absoluter means for obtaining an absolute value of an output signal of said subtracter means, so as to detect said horizontal edge components of said input picture signal.

4. A noise reduction apparatus as claimed in claim 1, wherein said input picture signal is colored and digitized at a sampling frequency of three times of a color subcarrier frequency and said vertical edge portion detector comprises:

a delay means for delaying said input picture signal by a duration of three times of the sampling interval, a subtracter means for subtracting said input picture signal from an output of said delay means, and an absoluter means for obtaining an absolute value of an output signal of said subtracter means, so as to detect said vertical edge components of said input picture signal.

5. A noise reduction apparatus as claimed in claim 1, wherein said input picture signal is colored and further said low pass filter means, said vertical edge portion detector means and said subtracter means are respectively supplied with said input picture signal respectively through respective delay means for compensating a time delay of said output signal of said horizontal edge portion detector means.

6. A noise reduction apparatus for reducing noise components in an input picture signal comprising:

a subtractor means for subtracting a predicted picture signal, formed at least by delaying an input picture signal, from said input picture signal to provide an output signal;

a multiplier means for multiplying the output signal of said subtractor means by a factor which does not exceed unity and providing an output signal;

an adder means for adding the output signal of said multiplier means to said predicted picture signal, to obtain an output picture signal of said noise reduction apparatus;

a frame memory means for delaying said output picture signal of said adder means by one frame duration to obtain a non-compensated predicted picture signal output;

a motion detector means for detecting a motion of said input picture signal by comparing said input picture signal with said non-compensated predicted picture signal output;

a motion compensator means for compensating said non-compensated predicted picture signal output in response to said motion detected by said motion detector means to obtain a motion-compensated predicted picture signal output;

a switch means for switching between said non-compensated predicted picture signal output and said motion compensated predicted picture signal output to obtain said predicted picture signal; and a switching signal generator means for generating a switching signal for controlling said switch means by comparing said non-compensated and said motion-compensated predicted picture signals with said input picture signal.

7. A noise reduction apparatus as claimed in claim 6, wherein said switching signal generator means comprises:

a first and a second subtracter means for subtracting said input picture signal respectively from said non-compensated and said motion-compensated predicted picture signals, a first and a second absoluter means for obtaining respective absolute values of respective output signals of said first and said second subtracter means, a first and a second comparator means for comparing respective output signals of said first and said second absoluter means respectively with respective thresholds, a third comparator means for comparing said respective output signals of said first and said second absoluter means with each other, and an AND gate means for forming a logic product of respective output signals of said first, said second and said third comparator means, so as to obtain said switching signal.

* * * * *